United States Patent
Mimata et al.

(10) Patent No.: US 7,796,176 B2
(45) Date of Patent: Sep. 14, 2010

(54) PHASE ADJUSTING DEVICE, PHASE ADJUSTING METHOD, AND DIGITAL CAMERA

(75) Inventors: Yoshiaki Mimata, Osaka (JP); Masahiro Ogawa, Osaka (JP); Mayu Ogawa, Osaka (JP); Kenji Nakamura, Osaka (JP)

(73) Assignee: Panasonic Corporation, Osaka (JP)

( * ) Notice: Subject to any disclaimer, the term of this patent is extended or adjusted under 35 U.S.C. 154(b) by 456 days.

(21) Appl. No.: 11/946,314

(22) Filed: Nov. 28, 2007

(65) Prior Publication Data
US 2008/0122942 A1    May 29, 2008

(30) Foreign Application Priority Data
Nov. 28, 2006   (JP)   ............... 2006-319640

(51) Int. Cl.
- H04N 3/14 (2006.01)
- H04N 9/64 (2006.01)
- H04N 5/335 (2006.01)

(52) U.S. Cl. .............. 348/312; 348/244; 348/297; 348/296; 348/311

(58) Field of Classification Search .............. 348/222.1, 348/223.1, 294, 296, 297, 241, 243, 244, 348/311, 312
See application file for complete search history.

(56) References Cited

U.S. PATENT DOCUMENTS

| | | | | |
|---|---|---|---|---|
| 6,160,578 | A * | 12/2000 | Carroll et al. | 348/222.1 |
| 7,061,530 | B2 * | 6/2006 | Koyama | 348/241 |
| 7,545,427 | B2 * | 6/2009 | Tokunaga | 348/312 |
| 2008/0309787 | A1 * | 12/2008 | Notsu et al. | 348/222.1 |
| 2008/0309803 | A1 * | 12/2008 | Morita et al. | 348/255 |
| 2009/0207253 | A1 * | 8/2009 | Ogawa et al. | 348/187 |

FOREIGN PATENT DOCUMENTS

| JP | 2005-151081 | 6/2005 |
|---|---|---|
| JP | 2005151081 A * | 6/2005 |

\* cited by examiner

*Primary Examiner*—Tuan Ho
*Assistant Examiner*—Marly Camargo
(74) *Attorney, Agent, or Firm*—McDermott Will & Emery LLP

(57) ABSTRACT

A temperature detecting unit detects a temperature of an imaging element for imaging an image signal. A storage unit stores phase change of a pulse, which is used by the imaging element when imaging the image signal, involved in temperature change of the imaging element in association with the temperature change. A timing adjustment unit checks temperature information of the imaging element detected by the temperature detecting unit with the phase change stored in the storage unit, and adjusts the phase of the pulse.

7 Claims, 12 Drawing Sheets

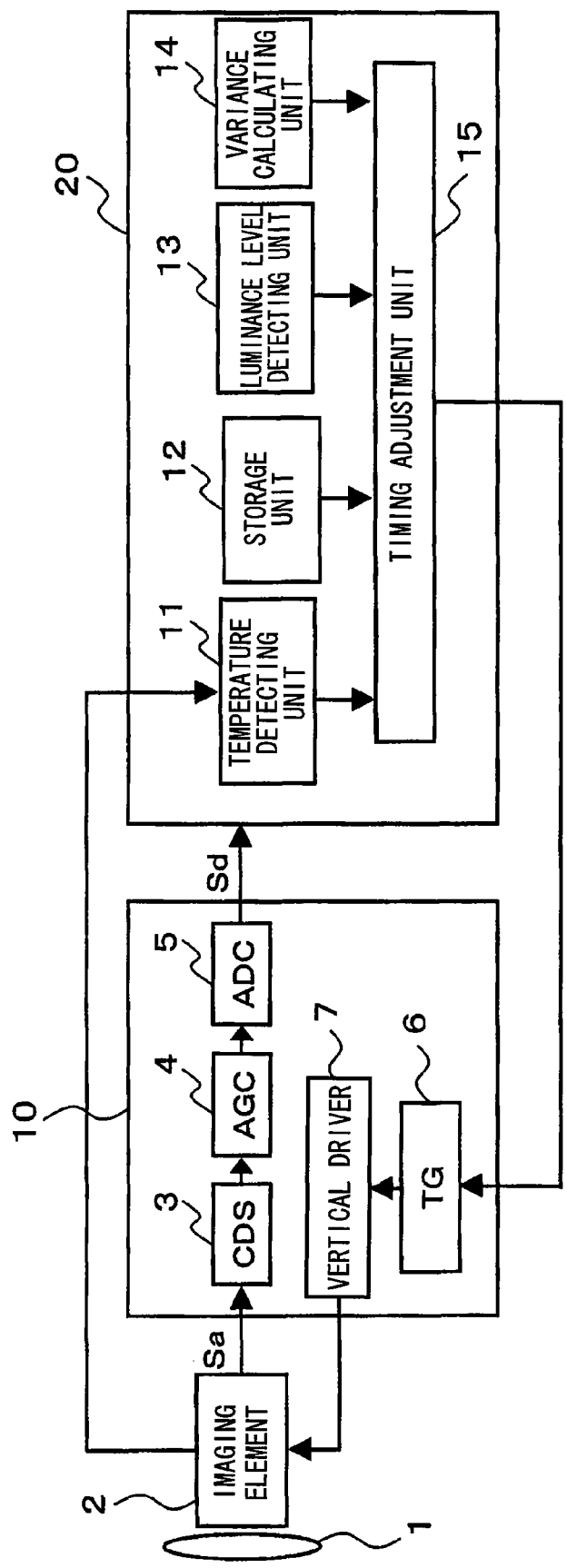

SET VALUE OF EACH PULSE IN TIME OF ADJUSTMENT

| PULSE TO BE ADJUSTED | DS2 SET VALUE | DS1 SET VALUE | ACK SET VALUE |
|---|---|---|---|
| DS2 | <ADJUSTMENT VALUE> | INITIAL VALUE | INITIAL VALUE |
| DS1 | OPTIMUM VALUE | <ADJUSTMENT VALUE> | INITIAL VALUE |
| ACK | OPTIMUM VALUE | OPTIMUM VALUE | <ADJUSTMENT VALUE> |

CHANGE AMOUNT TABLE IN TIME OF TEMPERATURE CHANGE

| AMOUNT OF TEMPERATURE CHANGE | AMOUNT OF PHASE CHANGE | PHASE ADJUSTMENT RANGE |
|---|---|---|
| $\Delta t1$ | $\Delta \theta 1$ | $\delta 1$ |
| $\Delta t2$ | $\Delta \theta 2$ | $\delta 2$ |
| ⋮ | ⋮ | ⋮ |
| $\Delta tm$ | $\Delta \theta m$ | $\delta m$ |
| ⋮ | ⋮ | ⋮ |

PHASE ADJUSTMENT OF AD CLOCK SIGNAL ACK

OPTIMIZATION OF PHASE OF PEAK SAMPLE PULSE DS2

F I G. 9
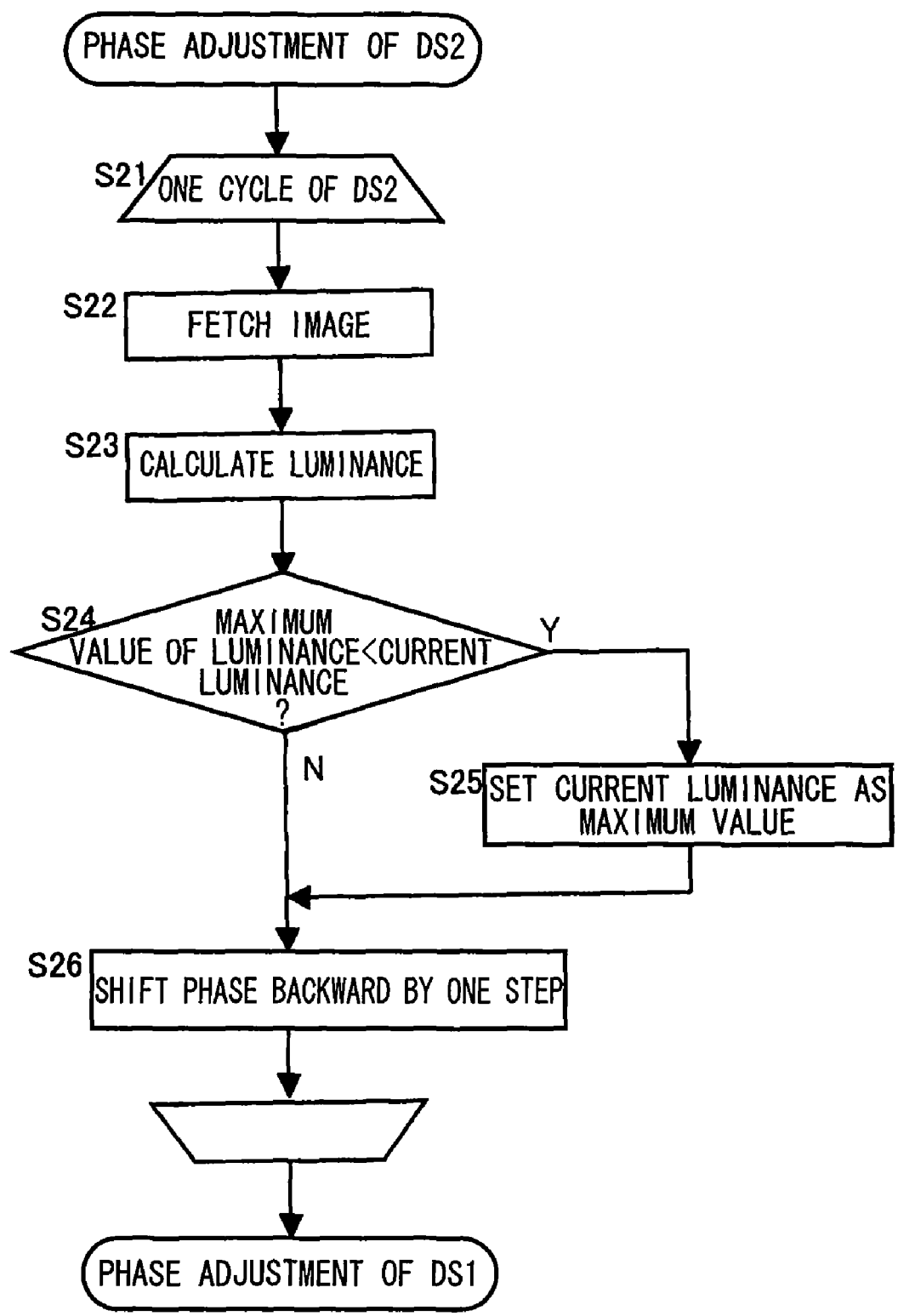

OPTIMIZATION OF PHASE OF REFERENCE SAMPLE PULSE DS1

OPTIMUM VALUE OF PHASE

PHASE ADJUSTING DEVICE, PHASE ADJUSTING METHOD, AND DIGITAL CAMERA

CLAIM OF PRIORITY

This application claims the benefit of Japanese Patent Application No. JP 2006-319640, filed on Nov. 28, 2006, the disclosure of which is incorporated herein by reference.

BACKGROUND OF THE INVENTION

1. Field of the Invention

The present invention relates to a phase adjusting device and a phase adjusting method for performing phase (timing) adjustment of a pulse used for imaging in the digital camera, as well as a digital camera incorporating the phase adjusting device.

2. Description of the Related Art

In digital cameras (a digital still camera, a digital video camera, a mobile phone with a built-in camera, and the like), an analog imaged signal that is imaged by an imaging element such as a CCD and an MOS sensor is converted to a digital imaged signal, and such digital imaged signal is subjected to a predetermined signal process and then recorded. The pulse for driving the imaging element, the pulse for detecting the signal level, and the like are required to image the subject with the imaging element. Since the phase of such pulses has variations originating from manufacturing, it is difficult to adjust the pulse phase when designing hardware. Thus, the technicians perform phase adjustment after manufacturing, store information indicating the adjusted phase in the storage region, and thereafter, read out the phase information from the storage region in actual use to set the optimum phase.

As disclosed in Japanese Laid-Open Patent Publication No. 2005-151081, a technique of mainly fetching noise component with the exposure time at a minimum and adjusting the phase under the condition the high frequency component (noise component) becomes minimum is conventionally known. This prior art example is hereinafter referred to as prior art example 1.

When environmental temperature fluctuates, the sample timing fluctuates due to temperature characteristics. In this case, noise occurs and the image quality degrades if the phase of the pulse remains fixed. The phase of the pulse thus must be adjusted, but rapid and easy response is difficult if the technician readjusts the phase by hand. Although the pulse to be adjusted exists in a plurality of types, the optimum phase is obtained in the prior art example 1 with the same method for all the pulses without taking characteristics of each pulse into consideration, and thus the precision is not very high.

SUMMARY OF THE INVENTION

It is a main object of the present invention to automatically adjust the phase of the pulse used in imaging.

(1) A phase adjusting device of the present invention includes, a temperature detecting unit for detecting temperature of an imaging element for imaging an image signal; a storage unit for storing phase change of a pulse, which is used by the imaging element when imaging the image signal, involved in temperature change of the imaging element in association with the temperature change; and a timing adjustment unit for checking temperature information of the imaging element detected by the temperature detecting unit with the phase change stored in the storage unit, and adjusting the phase of the pulse.

In such phase adjusting device, the temperature detecting unit detects the temperature of the imaging element, and provides the detected temperature information to the timing adjustment unit. The timing adjustment unit searches the storage unit based on the received temperature information, obtains the amount of change in the phase of the pulse involved in temperature change, and adjusts the phase of the current pulse to the phase of after temperature change. The process of the phase adjustment is automatically performed through cooperative operation of the temperature detecting unit, the storage unit, and the timing adjustment unit.

(2) A phase adjusting device of the present invention includes a temperature detecting unit for detecting temperature of an imaging element for imaging an image signal; a storage unit for storing phase change of a pulse, which is used by the imaging element when imaging the image signal, involved in temperature change of the imaging element in association with the temperature change; a luminance level detecting unit for detecting level of luminance of an imaged signal obtained from a plurality of pixels in a first pixel region of the imaging element; a variance calculating unit for calculating variance indicating signal variation between pixels in the imaged signal obtained from a plurality of pixels in a second pixel region of the imaging element; and a timing adjustment unit for adjusting the phase of the pulse based on the temperature information of the imaging element detected by the temperature detecting unit, the phase change stored in the storage unit, the luminance level of the imaged signal detected by the luminance level detecting unit, and the variance calculated by the variance calculating unit.

In the phase adjusting device of such configuration, the temperature detecting unit detects the temperature of the imaging element, and provides the detected temperature information to the timing adjustment unit. The timing adjustment unit searches the storage unit based on the received temperature information, obtains the amount of change in the phase of the pulse involved in temperature change, and adjusts the phase of the current pulse to the phase of after temperature change. Furthermore, the luminance level detecting unit detects the level of luminance of the imaged signal obtained from the plurality of pixels in the first pixel region of the imaging element, and provides the obtained luminance information to the timing adjustment unit. The timing adjustment unit further adjusts the phase of the pulse based on the received luminance information. The adjustment of the phase of the pulse based on the luminance information is suited for phase adjustment of the peak sample pulse for sampling the signal component that becomes a peak in the signal period, or for phase adjustment of the reference sample pulse for sampling the signal component that becomes a reference in correlated double sampling. The variance calculating unit calculates the variance indicating signal variation between the pixels in the imaged signal obtained from the plurality of pixels in the second pixel region of the imaging element, and provides the information of the obtained variance to the timing adjustment unit. The timing adjustment unit further adjusts the phase of the pulse based on the information of the received variance. The adjustment of the phase of the pulse based on the information of the variance is suited for phase adjustment of the AD clock signal which is an operation clock used when AD converting the analog imaged signal to the digital imaged signal. The above processes of phase adjustment are automatically performed through cooperative operation of the temperature detecting unit, the storage unit, the luminance level detecting unit, the variance calculating unit, and the timing adjustment unit. In adjustment of the phase of the pulse when the temperature is changed, the luminance level detecting unit actually measures the luminance, the variance calculating unit calculates the variance indicating signal variation between pixels for the imaged signal in the plurality of pixels, and the phase of the pulse is adjusted with the luminance and the variance taken into consideration, and thus the precision of the adjustment of the phase of the pulse becomes high.

(3) A digital camera of the present invention includes an imaging element for imaging an analog image signal; a correlated double sampling unit for performing correlated double sampling on the analog imaged signal and determining a signal level for every pixel of the analog image signal; an automatic gain controller for adjusting an amplitude of the analog imaged signal output from the correlated double sampling unit; an A/D converter for converting the analog imaged signal having the amplitude adjusted by the automatic gain controller to a digital imaged signal; the phase adjusting device having one of the configurations described above for setting the phase suited for the pulse used by the imaging element in imaging the imaged signal; and a timing generator for generating the pulse having the phase set by the phase adjusting device.

The imaging element, the correlated double sampling unit, the automatic gain controller, the AD converter, and the timing generator, which are components described above, are general components of the digital camera, and thus will not be specifically described. The feature lies in that the digital camera is mounted with the phase adjusting device of configuration (1) or (2).

(4) A phase adjusting method of the present invention includes the steps of storing phase change of a pulse, which is used by an imaging element when imaging an image signal, involved in temperature change of the imaging element in association with the temperature change; detecting temperature of the imaging element; and checking the detected temperature information of the imaging element with the stored phase change, and adjusting the phase of the pulse.

In the phase adjusting method, the phase of the pulse for driving the imaging element is automatically adjusted even if temperature change occurs.

(5) A phase adjusting method of the present invention is a phase adjusting method for adjusting a phase of a peak sample pulse for detecting a peak level of an analog imaged signal output from an imaging element, a phase of a reference sample pulse for detecting a signal level that becomes a reference when performing correlated double sampling on the analog imaged signal, and a phase of an AD clock signal used in converting the correlated double sampled analog imaged signal to a digital image signal; the method including the steps of storing phase change of a pulse, which is used by an imaging element when imaging an image signal, involved in temperature change of the imaging element in association with the temperature change; detecting temperature of the imaging element; checking the detected temperature information of the imaging element with the stored phase change, and adjusting the phase of the pulse; detecting luminance maximum phase of the peak sample pulse at which the luminance becomes a maximum by changing the phase of the peak sample pulse with the phase of the reference sample pulse and the phase of the AD clock signal fixed at initial values; setting the luminance maximum phase as the phase of the peak sample pulse; detecting a stable waveform region in which change in luminance is small by changing the phase of the reference sample pulse with the phase of the peak sample pulse fixed at the luminance maximum phase and the phase of the AD clock signal fixed at the initial value; setting a central phase of the stable waveform region as the phase of the peak sample pulse; detecting a variance minimum phase at which the variance become a minimum by changing the phase of the AD clock signal with the phase of the peak sample pulse fixed at the luminance maximum phase, the phase of the reference sample fixed at the center phase, and an incident light of the imaging element shielded; and setting the detected variance minimum phase as the phase of the AD clock signal.

In such phase adjusting method, in adjustment of the phase of the pulse when the temperature is changed, the luminance level detecting unit actually measures the luminance, the variance calculating unit calculates the variance indicating signal variation between pixels for the digital imaged signal in the plurality of pixels, and the phase of the pulse is adjusted with the luminance and the variance taken into consideration, and thus the precision of the adjustment of the phase of the pulse becomes high.

The phase adjusting method of (5) has a mode in which a range of changing at least one of the phase of the peak sample pulse, the phase of the reference sample pulse, or the phase of the AD clock signal is limited to a range shorter than one cycle of the pulse.

The phase assumed as optimum is presumed as existing near the phase of when shifted by the amount of phase change of the pulse read from the storage unit. The processing time can be reduced by limiting the range of performing the phase adjustment to a range shorter than one cycle.

According to the present invention, the characteristic change of the imaging element can be suppressed, and the time required for adjustment process can be reduced compared to when the technician adjusts the phase of the pulse by hand.

Furthermore, the precision of adjustment of the phase of the pulse becomes high by cooperatively operating the luminance level detection and the variance calculation.

According to present invention, the timing adjustment of the pulse used in imaging by the digital camera can be automatically performed, and thus has usability at least in the digital camera.

BRIEF DESCRIPTION OF THE DRAWINGS

The invention, together with objects and advantages thereof, may best be understood by reference to the following description of the presently preferred embodiment and will be apparent from the accompanying claims. Numerous advantages not mentioned in the specification should become apparent to those skilled in the art by implementing the invention.

FIG. 5 is a block diagram showing an overall configuration of a digital camera mounted with a phase adjusting device according to a second embodiment of the present invention;

FIG. 9 is a flowchart showing detailed operations of the phase adjustment of the peak sample pulse in the second embodiment of the present invention;

DETAILED DESCRIPTION OF THE PREFERRED EMBODIMENTS

The embodiment of a digital camera mounted with a phase adjusting device according to the present invention will now be described in detail with reference to the drawings.

First Embodiment

Figure 1:
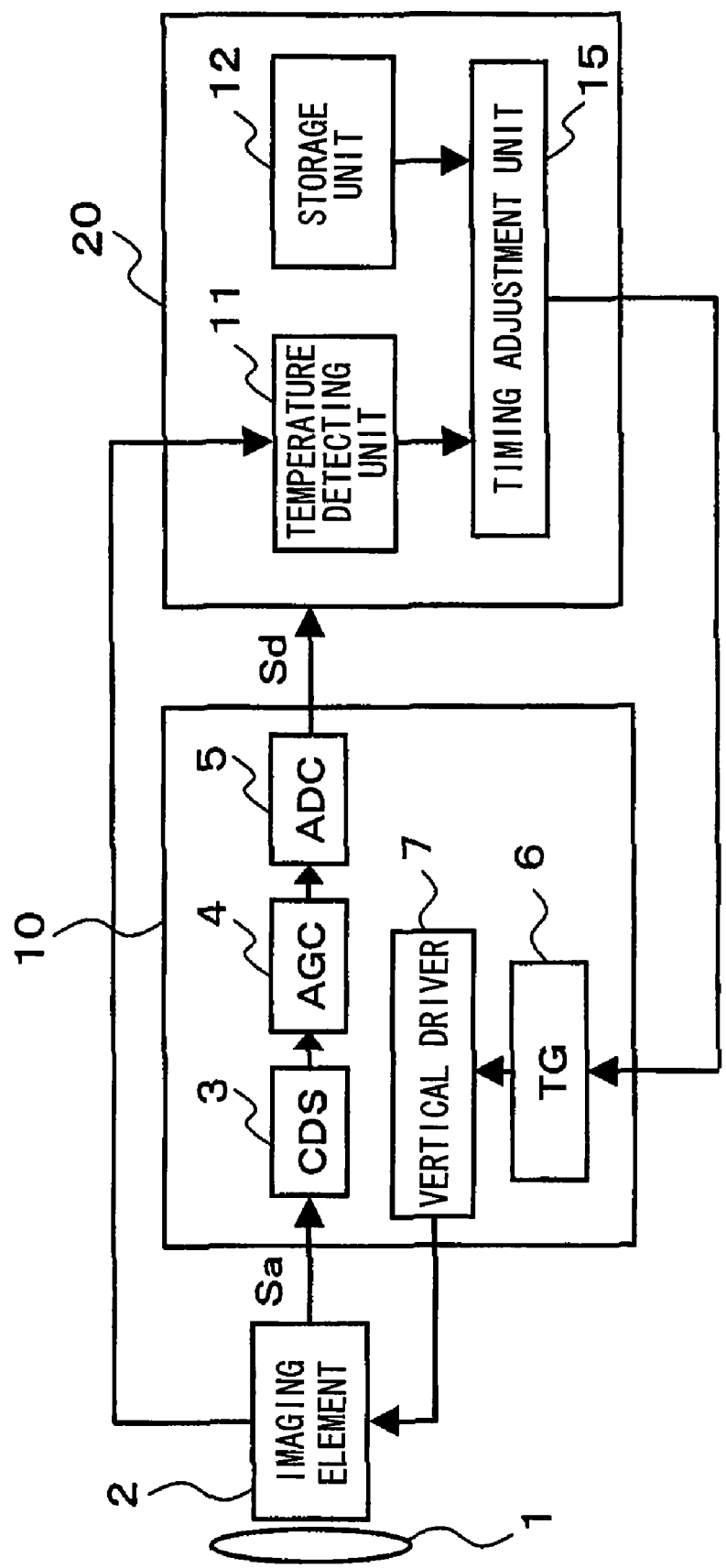
FIG. 1 is a block diagram showing an overall configuration of a digital camera mounted with a phase adjusting device according to a first embodiment of the present invention.

FIG. 1 is a block diagram showing an overall configuration of a digital camera according to a first embodiment of the present invention. The digital camera of the present embodiment includes an optical lens 1 for collecting the subject image on an imaging element 2, an imaging element 2 (a CCD is hereinafter described by way of example) for imaging the subject image collected by the optical lens 1, an analog front end 10 for performing a predetermined process on an analog imaged signal Sa output from the imaging element 2 to convert the same to a digital imaged signal Sd, and a DSP (Digital Signal Processor) 20 for performing a predetermined process (color correction, YC process, etc.) on the digital imaged signal Sd output from the analog front end 10 to generate an image signal.

The imaging element 2 includes a plurality of pixels, which includes an effective pixel region used for imaging the subject and an OB pixel region arranged in a light shielded state at the periphery of the effective pixel region and used for detection of an OB (Optical Black) level.

The analog front end 10 includes a correlated double sampling unit 3 for performing correlated double sampling (CDS) to determine the signal level of the analog imaged signal Sa output from the imaging element 2, an automatic gain controller (AGC) 4 for amplifying the signal output from the correlated double sampling unit 3 with an adjustable gain, an AD converter (Analog Digital Converter) 5 for converting the signal amplified by the automatic gain controller 4 to the digital imaged signal Sd, a timing generator 6 for generating a pulse used for imaging, and a vertical driver 7 for outputting the pulse generated by the timing generator 6 to the imaging element 2.

The DSP 20 includes a temperature detecting unit 11 for detecting the temperature of the imaging element 2, a storage unit 12 stored with amount of phase change of the pulse corresponding to temperature change from a reference temperature in a form of a table (hereinafter referred to as phase change amount table), and a timing adjustment unit 15 for performing phase (timing) adjustment of the pulse generated by the timing generator 6 based on the temperature information obtained from the temperature detecting unit 11 and the phase change amount table obtained from the storage unit 12, as components characteristic to the present invention. The temperature detecting unit 11 may use a temperature sensor. Furthermore, the temperature detecting unit 11 may be configured by that which detects information correlated with the temperature of the imaging element 2. The information correlated with the temperature of the imaging element 2 includes power consumption (average value or calculated cumulative value) of the imaging element 2.

Figure 2:
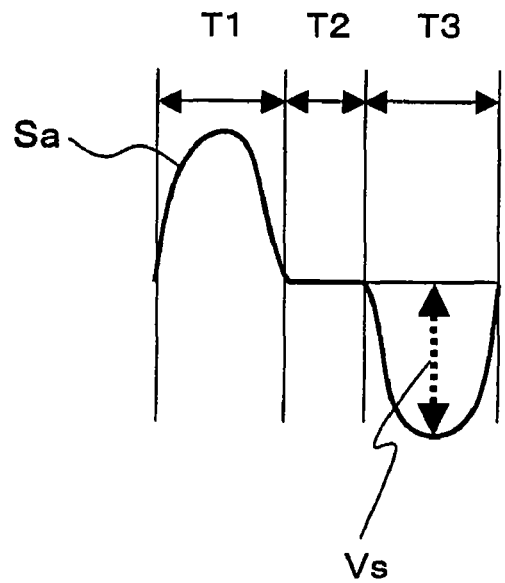
FIG. 2 is a view showing a signal component output from an imaging element in chronological order.

FIG. 2 is a view showing a signal component output from the imaging element 2 in chronological order. As shown in FIG. 2, the analog imaged signal Sa has a reset period T1, a reference period T2, an signal period T3. The reset period T1 is a period used to reset the imaging element 2. The reference period T2 is a period in which the reference voltage is output from the imaging element 2, and is a period for detecting the signal that becomes a reference when the correlated double sampling unit 3 operates. The signal period T3 is a period during which the signal voltage is output. The signal voltage that becomes a peak in the signal period T3, and the reference voltage in the reference period T2 are sampled and the difference between these voltages is taken to obtain the signal level Vs of the analog imaged signal Sa. In FIG. 2, the downward direction in the figure is defined as the positive direction of the signal component.

Figure 3:
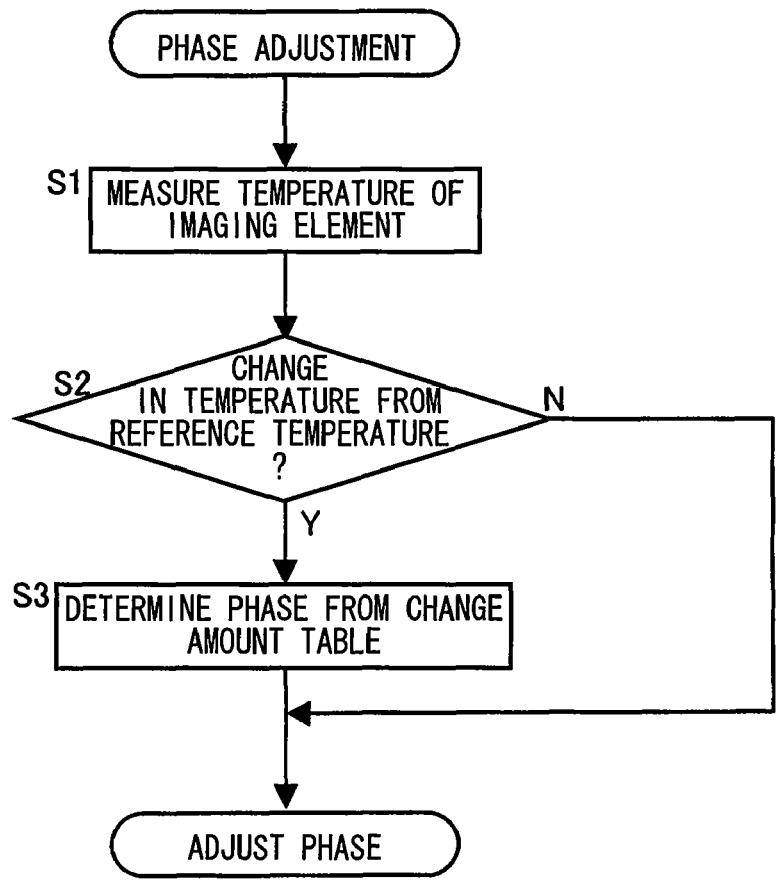
FIG. 3 is a flowchart showing an overall operation of phase adjustment according to the first embodiment of the present invention.

FIG. 3 shows an overall flow of phase adjustment of each pulse in the present embodiment. The phase adjustment is performed mainly by the temperature detecting unit 11, the storage unit 12 and the timing adjustment unit 15. In the present embodiment a reference sample pulse DS1, a peak sample pulse DS2, and an AD clock signal ACK are the pulses to be adjusted. The reference sample pulse DS1 is a pulse for sampling the signal component that becomes a reference in correlated double sampling. In the reference sample pulse DS1, the phase adjustment is desirably performed so that the rising edge appears at the center of the reference period. The peak sample pulse DS2 is a pulse for sampling the signal component that becomes a peak in the signal period T3. In the peak sample pulse DS2, the phase adjustment is desirably performed so that the rising edge appears when the signal component output from the imaging element 2 becomes the peak. The signal level Vs calculated by the correlated double sampling unit 3 is the difference between the signal component of the peak at the rise of the peak sample pulse DS2 and the signal component in the reference period defined by the rise of the reference sample pulse DS1. The AD clock signal ACK is a clock signal for operation of the AD converter 4. In the AD clock signal ACK, the phase adjustment is desirably performed so that the result of AD conversion does not vary.

Figures 4A, 4B:
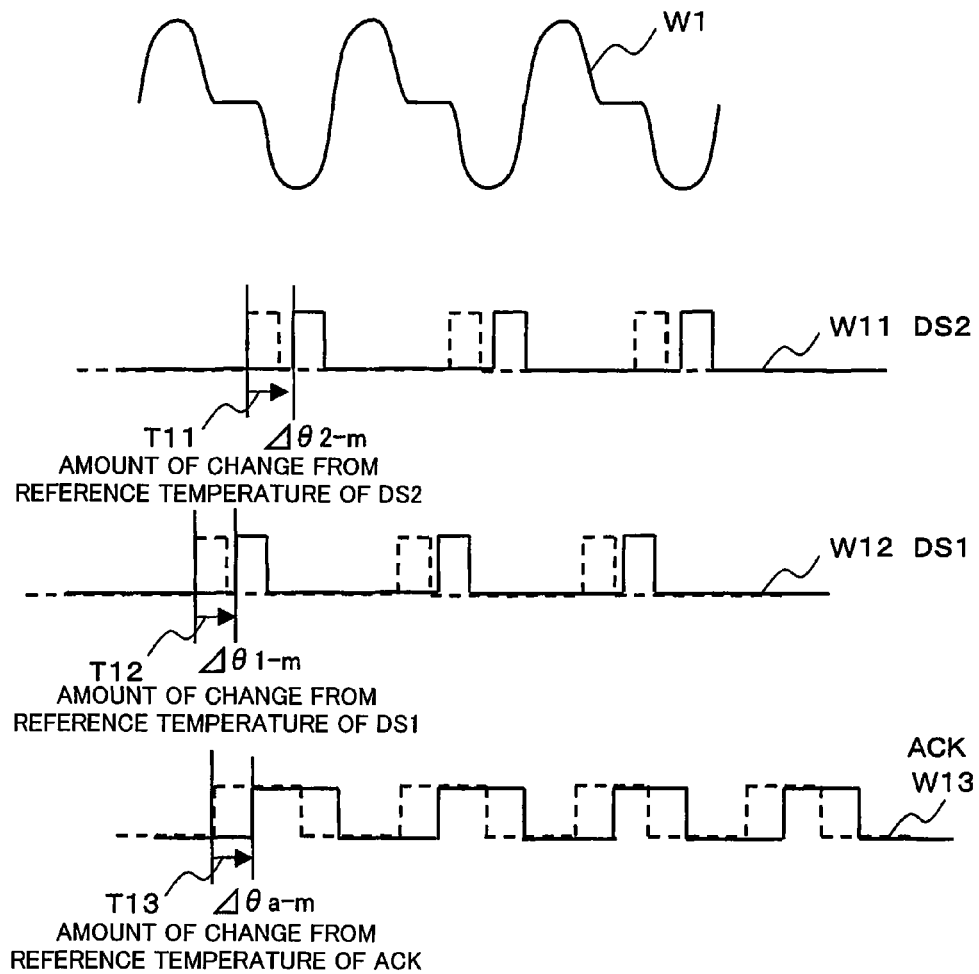
FIG. 4A is a first view describing an adjusting method when temperature is changed from a reference temperature.
FIG. 4B is a second view describing an adjusting method when temperature is changed from a reference temperature.

In the present embodiment, the temperature detecting unit 11 first measures the temperature of the imaging element 2, and reports the measurement result to the timing adjustment unit 15 (step S1). The timing adjustment unit 15 which has received the report on the measurement result judges whether or not temperature has changed from the reference temperature in the reported measurement result (step S2). If temperature has changed from the reference temperature, the timing adjustment unit 15 reads the amount of phase change from the phase at the reference temperature from the phase change amount table stored in the storage unit 12 for the reference sample pulse DS1, the peak sample pulse DS2 and the AD clock signal ACK, as shown in FIGS. 4A and 4B. The timing adjustment unit 15 then changes the phases of the reference sample pulse DS1, the peak sample pulse DS2, and the AD clock signal ACK by the read phase change amount to determine the optimum phase of each pulse DS1, DS2 and ACK (step S3). For instance, as shown in FIG. 4B, assume the amount of temperature change is Δtm. In this case, the amount of phase change from the time of reference temperature in the reference sample pulse DS1 is $\Delta\theta_{1-m}$, the amount of phase change from the time of reference temperature in the peak sample pulse DS2 is $\Delta\theta_{2-m}$, and the amount of phase change from the time of reference temperature in the AD clock signal ACK is $\Delta\theta_{a-m}$. Therefore, the reference sample pulse DS1 is phase adjusted at the phase change amount $\Delta\theta_{1-m}$ as indicated by W12 (see FIG. 4A); the peak sample pulse DS2 is phase adjusted at the phase change amount $\Delta\theta_{2-m}$ as indicated by W11 (see FIG. 4A); and the AD clock signal ACK is phase adjusted at the phase change amount $\Delta\theta_{a-m}$ as indicated by W13 (see FIG. 4A). The optimum phases of the reference sample pulse DS1, the peak sample pulse DS2 and the AD clock signal ACK are determined in such manner.

In the present embodiment, the reference sample pulse DS1, the peak sample pulse DS2 and the AD clock signal ACK are given as pulses to be adjusted, but the present invention is also applicable to other pulses such as drive pulse of the CCD in which characteristics change by temperature.

Second Embodiment

FIG. 5 is a block diagram showing an overall configuration of a digital camera according to a second embodiment of the present invention. In FIG. 5, same reference numerals as in FIG. 1 of the first embodiment denotes the same components. The specific configuration of the present embodiment is as follows. The DSP 20 includes a luminance level detecting unit 13 for detecting the level of luminance by calculating the average value of the signal level of the selected pixel within a predetermined region, and a variance calculating unit 14 for calculating the variance of the signal level between the selected pixels in addition to configurations (the temperature detecting unit 11, the storage unit 12 and the timing adjustment unit 15) similar to the first embodiment as components characteristic to the present invention. The timing adjustment unit 15 adjusts the phases of the reference sample pulse DS1, the peak sample pulse DS2, and the AD clock signal ACK according to the temperature information obtained from the temperature detecting unit 11, the pulse phase change amount table stored in the storage unit 12, the calculation result of the luminance level detecting unit 13 and the calculation result of the variance calculating unit 14. Other configurations are the same as in the first embodiment, and thus the description thereof will be omitted.

Figures 6A, 6B:
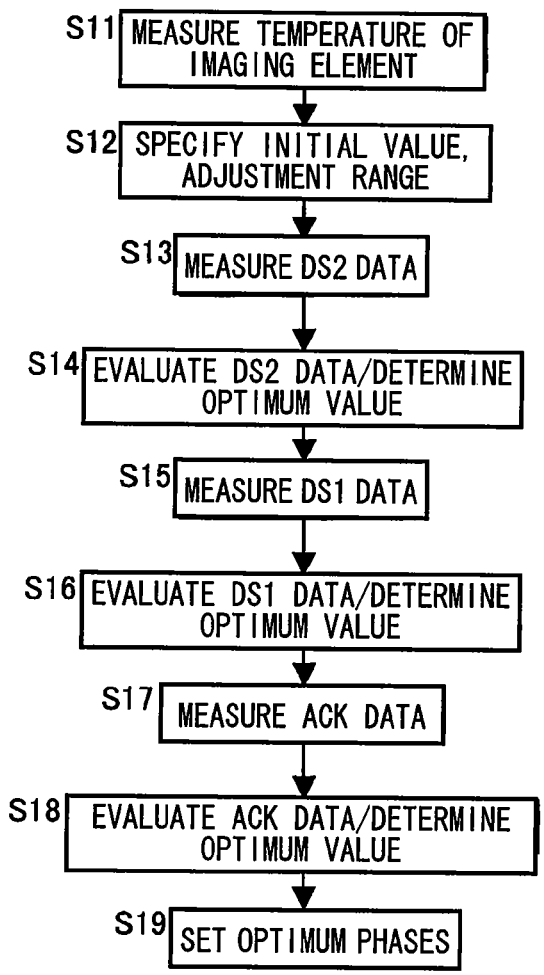
FIG. 6A is a flowchart showing an overall operation of phase adjustment in the second embodiment of the present invention.
FIG. 6B is an example of set values of the phase adjustment in the second embodiment of the present invention.

FIG. 6A shows an overall flow of phase adjustment of each pulse in the present embodiment. The phase adjustment is mainly performed by the temperature detecting unit 11, the storage unit 12, the luminance level detecting unit 13, the variance calculating unit 14 and the timing adjustment unit 15. In the present embodiment, the peak sample pulse DS2, the reference sample pulse DS1 and the AD clock signal ACK are the pulses to be adjusted.

Figures 7A, 7B:
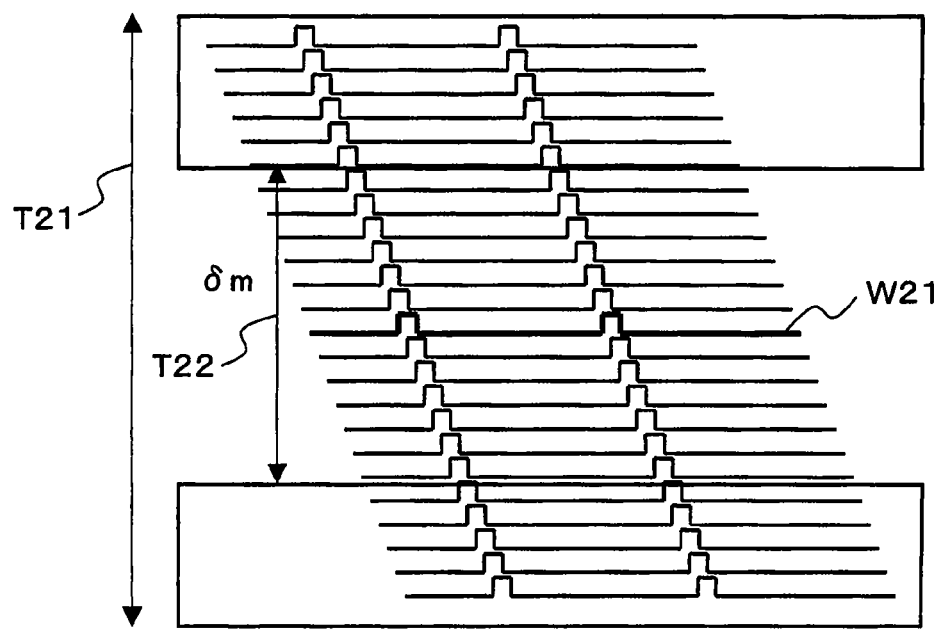
FIG. 7A is a first view describing an adjustment range when temperature is changed from a reference temperature.
FIG. 7B is a second view describing an adjustment range when temperature is changed from the reference temperature.

In the present embodiment, the temperature detecting unit 11 first measures the temperature of the imaging element 2 and reports the measurement result to the timing adjustment unit 15 (step S11). The timing adjustment unit 15 that has received the report of the measurement result judges whether or not temperature has changed from the reference temperature in the reported measurement result. If the temperature has changed from the reference temperature, the timing adjustment unit 15 reads out the amount of phase change from the reference temperature in the measurement result from the pulse phase change amount table stored in the storage unit 12 shown in FIG. 7A, and adjusts the phases of the reference sample pulse DS1, the peak sample pulse DS2, and the AD clock signal ACK with the read phase change amount. The phases of each pulse DS1, DS2, and ACK after adjustment are set as initial values. In this case, the optimum phase is assumed to exist near the phase read from the pulse phase change amount table. Thus, the timing adjustment unit 15 limits the range of performing phase adjustment to only within the range around the initial value, as shown by reference numeral δm in FIG. 7B (step S12). The processing time can be reduced by such limitation.

The range of adjustment described above does not necessarily need to be stored for every pulse, and may be defined as the same range in pulse units even when, for example, the temperature is changed due to memory reduction etc. Alternatively, the range of adjustment described above may not be stored in the storage unit 12 and the adjustment range defined in advance for all the pulses may be used.

The timing adjustment unit 15 then fixes the phases of the reference sample pulse DS1 and the AD clock signal ACK to the initial values defined in step S12, and measures the data necessary for determining the phase of the peak sample pulse DS2 while gradually shifting the phase of the peak sample pulse DS2 from the initial value (step S13). The timing adjustment unit 15 then evaluates the measured data to determine the phase optimum for the peak sample pulse DS2 (step S14).

After the phase of the peak sample pulse DS2 is determined, the timing adjustment unit 15 fixes the phase of the peak sample pulse DS2 to the determined optimum value. The timing adjustment unit 15 then further measures the data necessary for determining the phase of the reference sample pulse DS1 while gradually shifting the phase of the reference sample pulse DS1 from the initial value with the phase of the AD clock signal ACK fixed at the initial value (step S15). The timing adjustment unit 15 evaluates the data and determines the phase optimum for the reference sample pulse DS1 (step S16).

After the phases of the reference sample pulse DS1 and the peak sample pulse DS2 are determined, the timing adjustment unit 15 fixes such phases at the respective optimum values, and then measures the data necessary for determining the phase of the AD clock signal ACK while shifting the phase of the AD clock signal ACK from the initial value (step S17). The timing adjustment unit 15 evaluates the data to determine the phase optimum for the AD clock signal ACK (step S18). After the optimum phases in the reference sample pulse DS1, the peak sample pulse DS2 and the AD clock signal ACK are determined, the timing adjustment unit 15 sets the information related to the determined optimum phases in the register in the timing generator 6 (step S19). The timing generator 6 then generates pulses at the optimum phase.

Details of each step will now be described.

(Adjustment of Peak Sample Pulse DS2)

Figure 8:
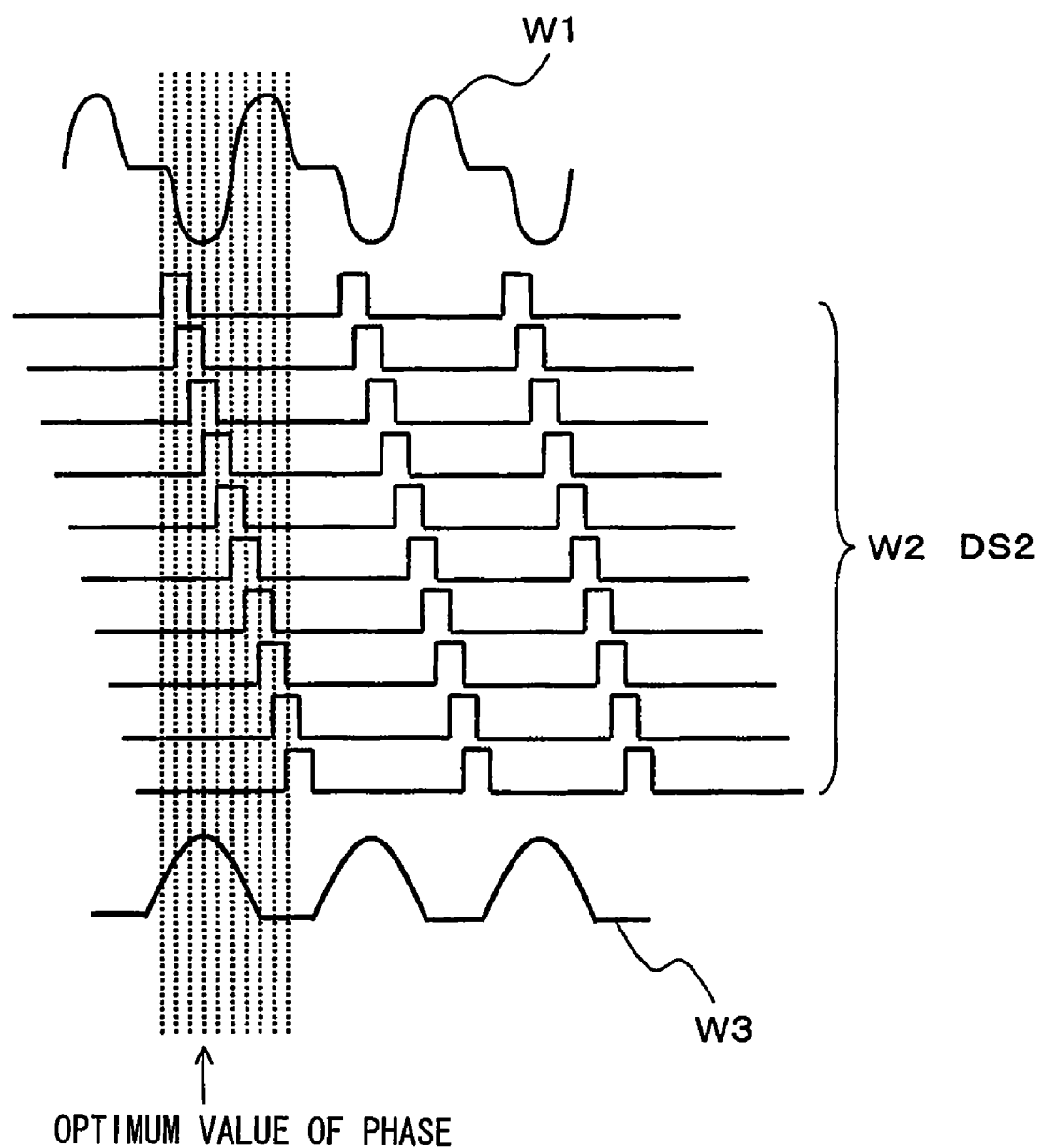
FIG. 8 is a timing chart of a signal component used in phase adjustment of a peak sample pulse in the second embodiment of the present invention.

First, phase adjustment of the peak sample pulse DS2 will be described with reference to FIGS. 8 and 9. FIG. 8 is a timing chart of a signal component used in phase adjustment of the peak sample pulse DS2, and FIG. 9 is a flowchart showing details of the phase adjustment of the peak sample pulse DS2. The processes correspond to steps S13 and S14 of FIG. 6.

In FIG. 8, W1 indicates the output signal of the imaging element and W3 indicates the luminance signal. The luminance in phase adjustment of the peak sample pulse DS2 is defined as an average value of the signal level of each pixel selected in a partial region or an entire region (referred to as peak sample pulse detection region) of the effective pixel region of the imaging element 2. When the output signal W1 of the imaging element is in a state shown in FIG. 8, the luminance signal W3 appears as a convex shape having a peak by fixing the phase of the reference sample pulse DS1 and the phase of the AD clock signal ACK and gradually shifting the phase of the peak sample pulse DS2 as shown by W2. The timing adjustment unit 15 determines the phase in the state the luminance signal W3 becomes the largest as the optimum phase of the peak sample pulse DS2. The signal level Vs for every pixel selected in the image data is the difference between the peak value of the signal component determined by the peak sample pulse DS2 and the reference signal component determined by the reference sample pulse DS1, as described above. Therefore, the difference becomes negative at locations where the positional relationship of the signal component in the peak sample pulse DS2 and the signal component in the reference sample pulse DS1 is reversed, but the difference is 0 in the figure since negative is not defined for the signal level in this example.

This will be described in further detail with reference to FIG. 9. First, in step S21, the DSP 20 sets the phase of the reference sample pulse DS1, the phase of the peak sample pulse DS2 and the phase of the AD clock signal ACK to the respective initial values, and in step S22, fetches the image data imaged by the imaging element 2.

In step S23, the luminance level detecting unit 13 detects the luminance in the peak sample pulse detection region of the image data fetched by the DSP 20. That is, the luminance level detecting unit 13 calculates the average value of the signal level of each pixel in the peak sample pulse detection region. With respect to the pixels having a signal level of greater than or equal to a predetermined value, the relevant pixels are assumed to be saturated, and thus sampling is performed excluding such pixels.

In step S24, the timing adjustment unit 15 compares the luminance calculated by the luminance level detecting unit 13 with a maximum value of the luminance up to the present time. If the calculated luminance is larger as a result of comparison, the timing adjustment unit 15 sets such luminance as the current maximum value in step S25. If the maximum value of the luminance up to the present time is larger, the maximum value of luminance is not updated.

In step S26, the timing adjustment unit 15 sends a command to the timing generator 6 to shift the phase of the peak sample pulse DS2 backward by one step with the phase of the reference sample pulse DS1 and the phase of the AD clock signal ACK fixed. In response thereto, the timing generator 6 shifts the phase of the peak sample pulse DS2 backward by one step.

After outputting the command to shift the phase by one step, the timing adjustment unit 15 returns to step S22 and calculates the maximum value of luminance by again performing the processes of steps S22 to S26 and comparing the calculated value and the stored maximum value of luminance. The timing adjustment unit 15 repeatedly performs such process over a period of one cycle, and determines the phase (luminance maximum phase) at when the luminance becomes a maximum as the optimum phase of the peak sample pulse DS2.

(Adjustment of Reference Sample Pulse DS1)

Figure 10:
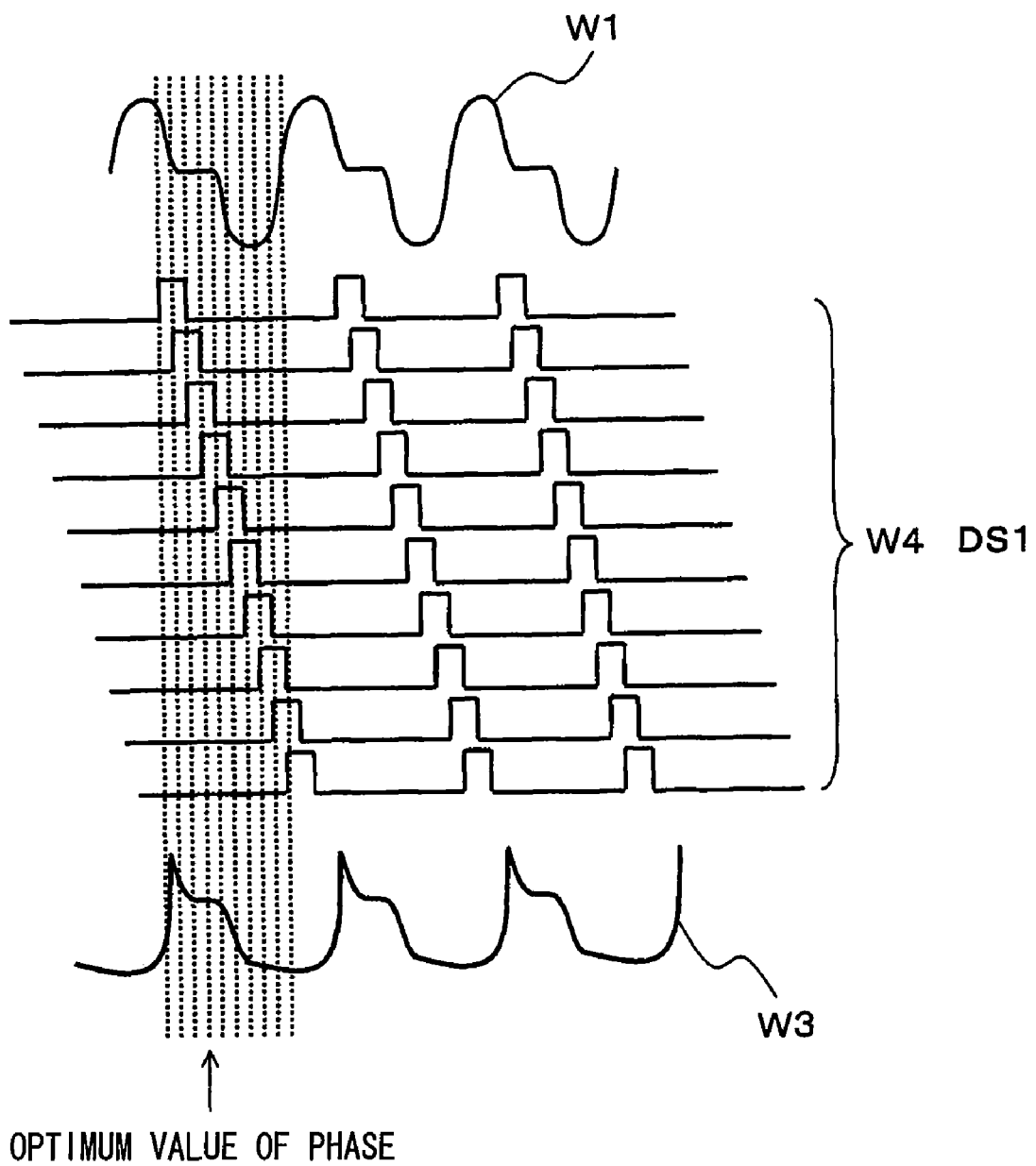
FIG. 10 is a timing chart of a signal component used in phase adjustment of a reference sample pulse in the second embodiment of the present invention.
Figure 11:
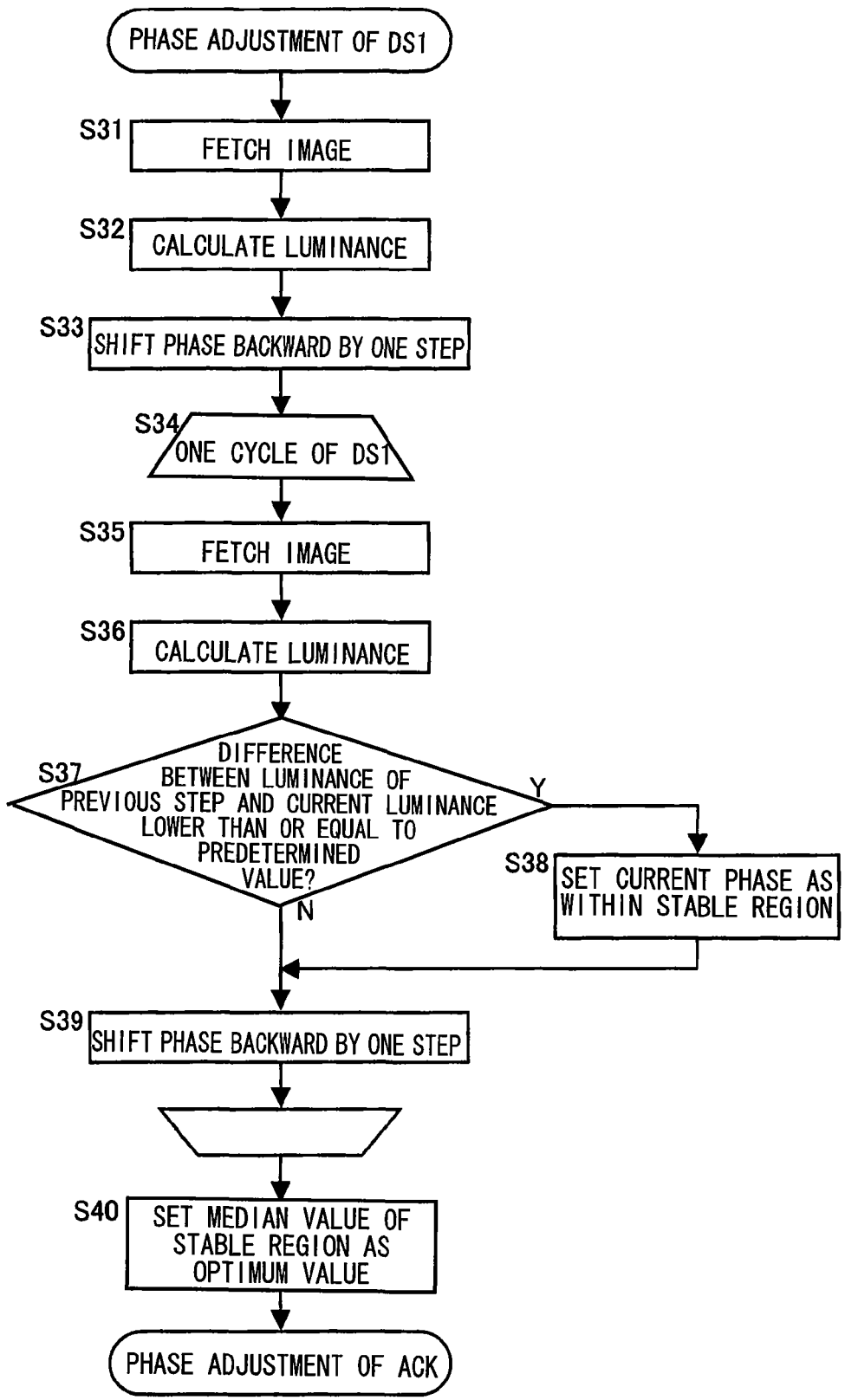
FIG. 11 is a flowchart showing detailed operations of the phase adjustment of the reference sample pulse in the second embodiment of the present invention.

The phase adjustment of the reference sample pulse DS1 will now be described with reference to FIGS. 10 and 11. FIG. 10 is a timing chart of a signal component used in phase adjustment of the reference sample pulse DS1, and FIG. 11 is a flowchart showing details of the phase adjustment of the reference sample pulse DS1. The processes correspond to steps S15 and S16 of FIG. 6.

In FIG. 10, W1 indicates the output signal of the imaging element and W3 indicates the luminance signal respectively. The luminance in phase adjustment of the reference sample pulse DS1 is defined as an average value of the signal level of each pixel selected in a partial region or an entire region (referred to as reference sample pulse detection region) of the effective pixel region of the imaging element 2. When the output signal W1 of the imaging element is in a state shown in FIG. 10, the luminance signal W3 drastically lowers and becomes substantially constant in the reference period, and then again lowers and becomes 0 at the point coinciding with the peak sample pulse DS2 by fixing the phase of the peak sample pulse DS2 and the phase of the AD clock signal ACK and gradually shifting the phase of the reference sample pulse DS1 as shown by W4 from the initial value. The timing adjustment unit 15 determines the phase of the reference sample pulse DS1 so that the rising edge appears at the center phase of an interval (hereinafter referred to as stable waveform region) in which the luminance signal W3 is substantially constant.

This will be described in further detail with reference to FIG. 11. First, in step S31, the DSP 20 sets the phase of the reference sample pulse DS1 and the phase of the AD clock signal ACK to the respective initial values. The DSP 20 then sets the phase of the peak sample pulse DS2 to the optimum value determined through the adjusting method described above, and fetches the image data imaged by the imaging element 2 in such state.

In step S32, the luminance level detecting unit 13 detects the luminance in the reference sample pulse detection region of the fetched image data. That is, the luminance level detecting unit 13 calculates the average value of the signal level of each pixel in the reference sample pulse detection region. With respect to the pixels having a signal level of greater than or equal to a predetermined value, the relevant pixels are assumed to be saturated, and thus sampling is performed excluding such pixels.

In step S33, the timing adjustment unit 15 sends a command to the timing generator 6 to shift the phase of the reference sample pulse DS1 backward by one step with the phase of the peak sample pulse DS2 and the phase of the AD clock signal ACK fixed.

After shifting the phase by one step, the timing adjustment unit 15 performs setting of the repetitive process in the period of one cycle for the reference sample pulse DS1 in step S34. In response, the DSP 20 fetches the image data imaged by the imaging element 2 in step S35. The luminance level detecting unit 13 detects the luminance in the reference sample pulse detection region of the fetched image data in step S36.

In step S37, the timing adjustment unit 15 takes the difference between the luminance calculated from the image data fetched at the phase of the reference sample pulse DS1 one step before and the luminance calculated from the image data detected at the current phase, and determines whether or not the difference is lower than or equal to a predetermined threshold value. If the difference is lower than or equal to a predetermined threshold value, the timing adjustment unit 15 judges that the current phase is within the stable waveform region in step S38.

In step S39, the timing adjustment unit 15 sends a command to the timing generator 6 to shift the phase of the reference sample pulse DS1 backward by one step with the phase of the peak sample pulse DS2 and the phase of the AD clock signal ACK fixed. In response thereto, the timing generator 6 shifts the phase of the reference sample pulse DS1 backward by one step.

After outputting the command to shift the phase by one step, the timing adjustment unit 15 returns to step S35, and judges whether the shifted phase is within the stable waveform region by again performing the processes of steps S35 to S39. The timing adjustment unit 15 repeatedly performs such process over a period of one cycle, and judges from which phase to which phase the stable waveform region exists.

Finally, in step S40, the timing adjustment unit 15 determines the median value (center phase) of the phase judged as the stable waveform region as the optimum value for the phase of the reference sample pulse DS1. In the final judgment of the stable waveform region, when the phase region judged as the stable waveform region exists for two or more non-continuous intervals, the timing adjustment unit 15 may ignore the short interval or may judge the interval in which the phase judged as the stable waveform region continued the longest as the stable waveform region.

When the noise component is large, the stable waveform region may be mistakenly detected or may not be detected with only the difference of two pixels. In such case, the timing adjustment unit 15 uses filter computation etc. to calculate the difference between the average value of luminance in three or more phases and the average value of luminance in the current phase, and compares the difference calculated in such manner with the threshold value. Alternatively, the variance of the luminance in three or more phases is calculated, and the calculated variance of luminance is compared with the threshold value.

The initial value of the phase of the reference sample pulse DS1 used in the phase adjustment flow of the reference sample pulse DS1 and the peak sample pulse DS2 may be the same or may be different. For instance, the initial value of the phase of the reference sample pulse DS1 in the phase adjustment flow of the peak sample pulse DS2 may be set so as to be near the reference period presumed from the design specification, and the initial value of the phase of the reference sample pulse DS1 for fetching the first image data in the phase adjustment flow of the reference sample pulse DS1 may be set so as to be within the reset period to detect drastic lowering of the luminance signal.

(Phase Adjustment of the AD Clock Signal ACK)

Figure 12:
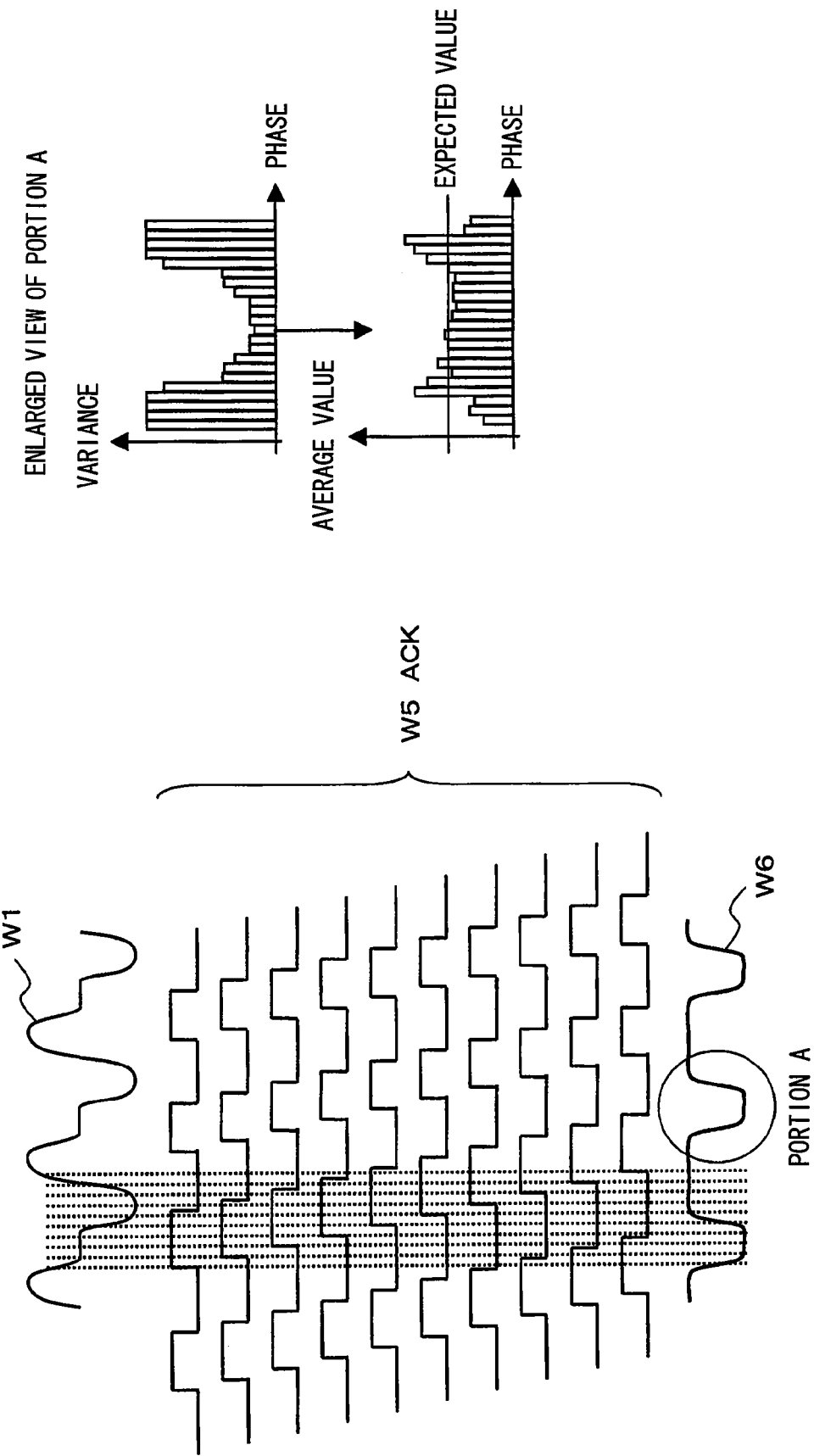
FIG. 12A is a timing chart of a signal component used in phase adjustment of an AD clock signal according to the second embodiment.
FIG. 12B is a view describing adjustment extent of the variance in the second embodiment of the present invention.
Figure 13:
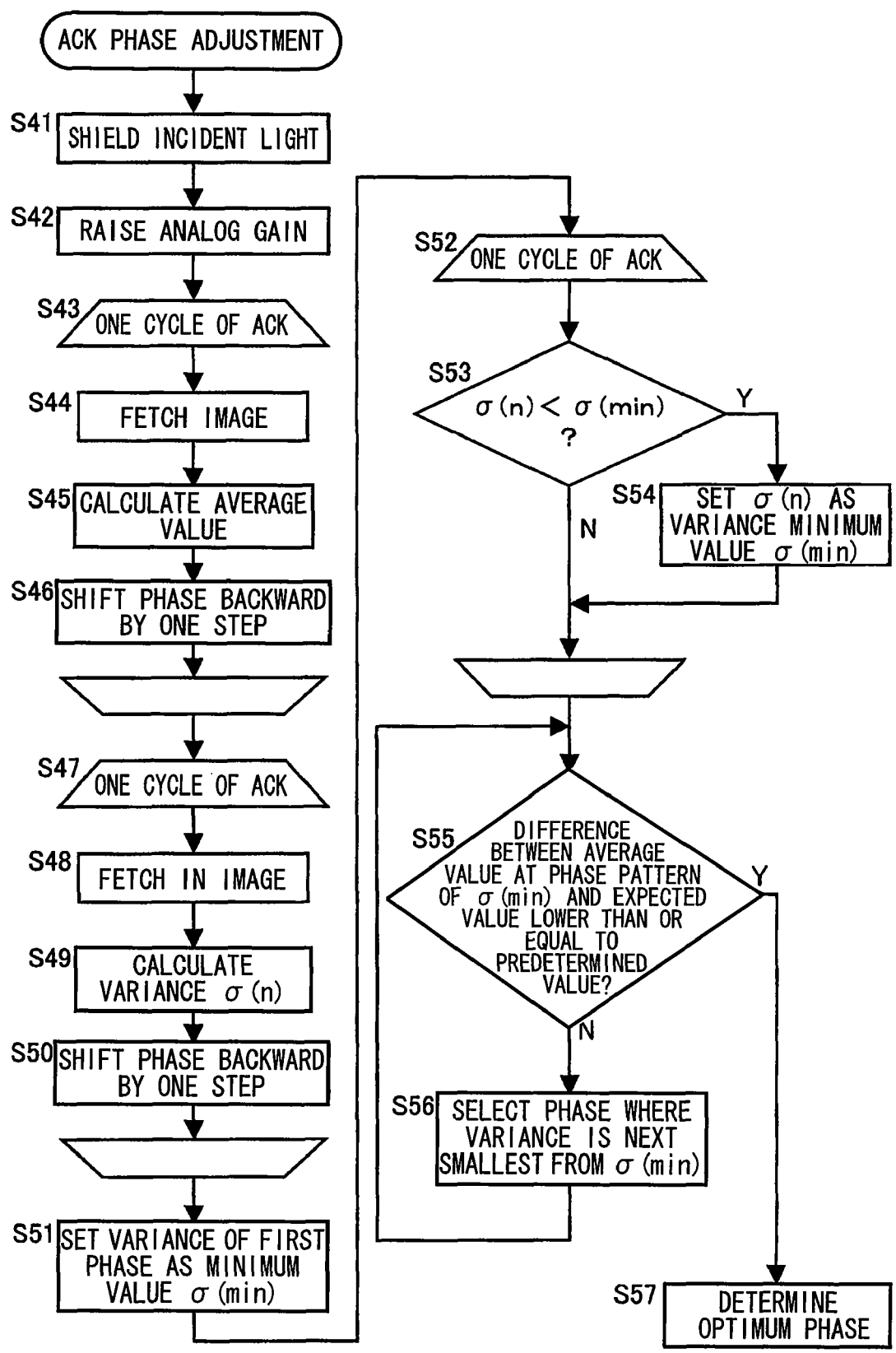
FIG. 13 is a flowchart showing detailed operations of the phase adjustment of the AD clock signal in the second embodiment of the present invention.

The phase adjustment of the AD clock signal ACK will now be described with reference to FIGS. 12A, 12B, and 13. FIG. 12 is a timing chart of a signal component used in phase adjustment of the AD clock signal. FIG. 13 is a flowchart showing details of the phase adjustment of the AD clock signal ACK and corresponds to steps S17 and S18 of FIG. 6.

In FIGS. 12A and 12B, W1 indicates the output signal of the imaging element and W6 indicates the variance. Variance referred to herein is defined as variance of the signal level of each pixel in a partial region or an entire region (referred to as AD clock signal detection region) of the effective pixel region and/or OB pixel region with the imaging element 2 light shielded. That is, variance is a value indicating the extent of variation of the signal level of each pixel which should be constant in a state of ideal condition in which the imaging element 2 is light shielded. Therefore, the phase of the AD clock signal ACK must be set so that the variance becomes small. The pixel region of calculating the variance may be the same as or may be different from the pixel region of detecting the luminance.

When the output signal W1 of the imaging element is in a state shown in FIG. 12A, the variance has a concave shape as shown by W6 by shifting the phase of the AD clock signal ACK from the initial value as shown by W5 with the phase of the reference sample pulse DS1 and the phase of the peak sample pulse DS2 fixed at the optimum values. Normally, the phase of the AD clock signal ACK must be determined so that the variance W6 takes a smallest value. However, the variance W6 sometimes becomes a minimum at an erroneous position for some reason. Thus, the timing adjustment unit 15 judges if the variance W6 judged as the minimum became the minimum at the erroneous position in the following manner.

The timing adjustment unit 15 compares the luminance in the AD clock signal detection region with an expected value of DC offset in the design specification at the phase where variance W6 is judged as the minimum. The effective pixel region of the imaging element 2 in a state where the imaging element 2 is light-shielded may be used as the AD clock signal detection region. In this case, the imaging element 2 is light-shielded by closing a mechanical shutter and shielding the incident light. Since the OB pixel region of the imaging element 2 is light-shielded, the expected value of the DC offset in the design specification exists in the luminance level of the OB pixel region. Thus, the luminance level of the OB pixel region can be used as the expected value of the DC offset in the design specification.

The OB pixel region of the imaging element 2 may be used as the AD clock signal detection region. In this case, the mechanical shutter does not need to be closed since the OB pixel region is light shielded from the beginning.

In the comparison judgment described above, the AD clock signal ACK cannot be assumed as optimum if the luminance in the AD clock signal detection region is far from the expected value. Thus, when the difference between the luminance in the AD clock signal detection region and the expected value is lower than or equal to a constant threshold value at the phase where the variance W6 is judged as the minimum, the timing adjustment unit 15 assumes the relevant phase as the optimum value for the phase of the AD clock signal ACK. However, if the difference between the luminance and the expected value is larger than the constant threshold value, the timing adjustment unit 15 judges whether or not the difference between the luminance and the expected value is lower than or equal to the constant threshold value at a phase where the variance W6 is the next smallest from the above phase. The timing adjustment unit 15 repeats such judgment process to determine the optimum value for the phase of the AD clock signal ACK.

This will be described in further detail below with reference to FIG. 13. In step S41, the incident light of the imaging element 2 is light shielded by closing the mechanical shutter. This step is not necessary when the OB pixel region is the AD clock signal detection region. In step S42, the AGC 4 raises the analog gain to amplify only the noise component. In step S43, the phases of the reference sample pulse DS1 and the peak sample pulse DS2 are set to the determined optimum values and the phase of the AD clock signal ACK is set to the initial value; and in step S44, the DSP 20 fetches the image data imaged by the imaging element 2. In step S45, the luminance level detecting unit 13 detects the luminance in the AD clock signal detection region of the fetched image data. That is, the luminance level detecting unit 13 calculates the average value of the signal level of each pixel in the AD clock signal detection region. In step S46, the timing adjustment unit 15 sends a command to the timing generator 6 to shift the phase of the AD clock signal ACK backward by one step with the phase of the reference sample pulse DS1 and the phase of the peak sample pulse DS2 fixed. In response, the timing generator 6 shifts the phase of the AD clock signal ACK backward by one step.

After outputting the command to shift the phase by one step, the timing adjustment unit 15 returns to step S44, again performs the processes of steps S44 to S46, and repeats the same for a period of one cycle to detect the luminance for every phase. The calculated luminance is once stored in a memory (not shown). In step S47, the timing adjustment unit 15 sets the phase of the reference sample pulse DS1 and the phase of the peak sample pulse DS2 at the determined optimum values, and sets the phase of the AD clock signal ACK at the initial value. In step S48, the DSP 20 again fetches the image data imaged by the imaging element 2. In step S49, the variance calculating unit 14 calculates the variance σ(n) of the AD clock signal detection region of the fetched image data. Here, n is an arbitrary positive number that indicates the number of phase states that can be set within the period of one cycle, where the variance calculating unit 14 calculates the variance of the signal levels of each pixel in the AD clock signal detection region. In step S50, the timing adjustment unit 15 sends a command to the timing generator 6 to shift the phase of the AD clock signal ACK backward by one step with the phase of the reference sample pulse DS1 and the phase of the peak sample pulse DS2 fixed. In response, the timing generator 6 shifts the phase of the peak sample pulse DS2 backward by one step.

After shifting the phase by one step, the timing adjustment unit 15 returns to step S48, and again performs the processes of steps S48 to S50. The variance calculating unit 14 calculates the variance of every phase by repeating the series of processes over a period of one cycle. The calculated variance is once stored in the storage unit 12. The distribution of luminance and the distribution of variance are performed in different image retrievals in the present description, but both may be calculated in one image retrieval.

The distributions for every phase of the luminance and the variance are stored in the storage unit 12 through the processes described above. The timing adjustment unit 15 then calculates the optimum phase of the AD clock signal ACK in the following manner using the data stored in the memory.

First, in step S51, the timing adjustment unit 15 sets the variance σ(1) of the first phase as the minimum value σ(min). In step S53, the timing adjustment unit 15 sets the variance of the second and subsequent phases as σ(n) and compares the variance σ(n) and σ(min). If the σ(n) is smaller, σ(n) is set as a new minimum value σ(min) in step S54. The timing adjustment unit 15 calculates the phase where variance becomes a minimum (variance minimum phase) by repeating the processes of steps S53 and S54 up to the last phase. In step S55, the timing adjustment unit 15 judges whether or not the difference between the luminance at the variance minimum phase and the expected value defined by the design specification is lower than or equal to a predetermined threshold value. If larger than the predetermined threshold value, the timing adjustment unit 15 performs the process of step S56 at the phase where variance is the next smallest from the above phase (phase of σ(min)). The timing adjustment unit 15 repeats the processes of steps S55 and S56 until the optimum phase is determined. When the state falling within the predetermined threshold value is obtained, the timing adjustment unit 15 determines the phase at that time as the optimum phase of the AD clock signal ACK in step S57.

The phase of the reference sample pulse DS1, the phase of the peak sample pulse DS2, and the phase of the AD clock signal ACK can be automatically adjusted according to the configuration of the embodiment of the present invention described above. Therefore, even if the characteristics of the imaging element 2 change by external factor (temperature, aging degradation, etc.), or even if the imaging element 2 itself is changed, the phase of the pulse output from the timing generator 6 can be automatically adjusted. Furthermore, since the phases of the pulses are adjusted with individual method in view of the characteristics of each pulse, automatic adjustment of high precision becomes possible.

Obviously, if precision is not a concern, the phases of all the pulses of the reference sample pulse DS1, the peak sample pulse DS2, and the AD clock signal ACK do not necessarily need to be adjusted, and the phase of other pulses may be secondarily calculated from the phase of the pulse calculated first, or the phase of the third pulse may be determined from the phase of the pulse calculated second.

The optimum phase is presumed to exist near the previously adjusted phase. Therefore, the result of phase adjustment may be stored in the storage unit 12 every time, or the most recent information may be constantly stored in the storage unit 12.

The embodiment described above is merely an example, and it should be recognized that various modifications can be made within the scope of the main purport of the invention.

Although the invention has been described in detail in its most preferred form, it is understood that the present disclosure of the preferred form has been changed in the details of construction and arrangement of parts may be resorted to without deviating from the spirit and scope of the invention as hereinafter claimed.

What is claimed is:

1. A phase adjusting device comprising:
   a temperature detecting unit for detecting temperature of an imaging element for imaging an image signal;
   a storage unit for storing phase change of a pulse used by the imaging element when imaging the image signal, wherein the phase change of a pulse results from temperature change of the imaging element and the storing of the phase change of the pulse is performed in association with the temperature change; and
   a timing adjustment unit for checking temperature information of the imaging element detected by the temperature detecting unit with the phase change stored in the storage unit, and adjusting the phase of the pulse.

2. A digital camera comprising:
   an imaging element for imaging an analog image signal;
   a correlated double sampling unit for performing correlated double sampling on the analog imaged signal and determining a signal level for every pixel of the analog image signal;
   an automatic gain controller for adjusting an amplitude of the analog imaged signal output from the correlated double sampling unit;
   an A/D converter for converting the analog imaged signal having the amplitude adjusted by the automatic gain controller to a digital imaged signal;
   the phase adjusting device according to claim 1 for setting the phase suited for the pulse used by the imaging element in imaging the imaged signal; and
   a timing generator for generating the pulse having the phase set by the phase adjusting device.

3. A phase adjusting method comprising the steps of:
   storing phase change of a pulse used by an imaging element when imaging an image signal, wherein the phase change of a pulse results from temperature change of the imaging element, the storing step being performed in association with the temperature change;

detecting temperature of the imaging element; and checking the detected temperature information of the imaging element with the stored phase change, and adjusting the phase of the pulse.

4. A phase adjusting device comprising:

a temperature detecting unit for detecting temperature of an imaging element for imaging an image signal;

a storage unit for storing phase change of a pulse used by the imaging element when imaging the image signal, wherein the phase change of a pulse results from temperature change of the imaging element and the storing of the phase change of the pulse is performed in association with the temperature change;

a luminance level detecting unit for detecting a level of luminance of an imaged signal obtained from a plurality of pixels in a first pixel region of the imaging element;

a variance calculating unit for calculating variance indicating signal variation between pixels in the imaged signal obtained from a plurality of pixels in a second pixel region of the imaging element; and a timing adjustment unit for adjusting the phase of the pulse based on the temperature information of the imaging element detected by the temperature detecting unit, the phase change stored in the storage unit, the luminance level of the imaged signal detected by the luminance level detecting unit, and the variance calculated by the variance calculating unit.

5. A digital camera comprising:

an imaging element for imaging an analog image signal;

a correlated double sampling unit for performing correlated double sampling on the analog imaged signal and determining a signal level for every pixel of the analog image signal;

an automatic gain controller for adjusting an amplitude of the analog imaged signal output from the correlated double sampling unit;

an A/D converter for converting the analog imaged signal having the amplitude adjusted by the automatic gain controller to a digital imaged signal;

the phase adjusting device according to claim 4 for setting the phase suited for the pulse used by the imaging element in imaging the imaged signal; and a timing generator for generating the pulse having the phase set by the phase adjusting device.

6. A phase adjusting method for adjusting a phase of a peak sample pulse for detecting a peak level of an analog imaged signal output from an imaging element, a phase of a reference sample pulse for detecting a signal level that becomes a reference when performing correlated double sampling on the analog imaged signal, and a phase of an AD clock signal used in converting the correlated double sampled analog imaged signal to a digital image signal; the method comprising the steps of:

storing phase change of a pulse used by an imaging element when imaging an image signal, wherein the phase change of a pulse results from temperature change of the imaging element, the storing step being performed in association with the temperature change;

detecting temperature of the imaging element;

checking the detected temperature information of the imaging element with the stored phase change, and adjusting the phase of the pulse;

detecting luminance maximum phase of the peak sample pulse at which the luminance becomes a maximum by changing the phase of the peak sample pulse in a state where the phase of the reference sample pulse and the phase of the AD clock signal are fixed at initial values;

setting the luminance maximum phase as the phase of the peak sample pulse;

detecting a stable waveform region in which change in luminance is small by changing the phase of the reference sample pulse in a state where the phase of the peak sample pulse is fixed at the luminance maximum phase and the phase of the AD clock signal is fixed at the initial value;

setting a center phase of the stable waveform region as the phase of the peak sample pulse;

detecting a variance minimum phase at which the variance become a minimum by changing the phase of the AD clock signal in a state where the phase of the peak sample pulse is fixed at the luminance maximum phase, the phase of the reference sample is fixed at the center phase, and an incident light of the imaging element is shielded; and setting the detected variance minimum phase as the phase of the AD clock signal.

7. The phase adjusting method according to claim 6, wherein a range of changing at least one of the phase of the peak sample pulse, the phase of the reference sample pulse, and the phase of the AD clock signal is limited to a range shorter than one cycle of the pulse.

* * * * *